F. W. WANDA.
CASTER.
APPLICATION FILED NOV. 22, 1915.

1,171,569.

Patented Feb. 15, 1916.

Inventor,
Frank W. Wanda.
By Allen & Daggett,
Attorneys.

UNITED STATES PATENT OFFICE.

FRANK W. WANDA, OF MADISON, MAINE.

CASTER.

1,171,569.  Specification of Letters Patent.  Patented Feb. 15, 1916.

Application filed November 22, 1915. Serial No. 62,746.

*To all whom it may concern:*

Be it known that I, FRANK W. WANDA, a citizen of the United States, residing at Madison, in the county of Somerset, in the State of Maine, have invented a certain new and useful Improvement in Casters, of which the following is a specification, reference being had to the accompanying drawings.

My invention relates in general to furniture casters and more particularly to casters for use in moving heavy articles, such as machinery, and my object is to provide a novel construction of caster which may be readily attached to, and removed from, the framework of looms, engines and the like articles for temporary use while moving said articles from place to place.

Figure 1:
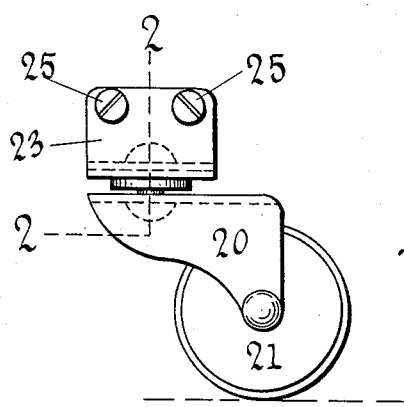
Figure 2:
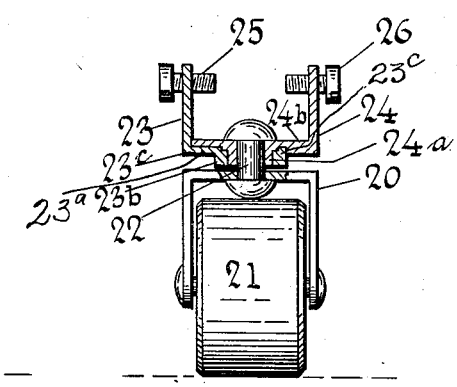
Figure 3:
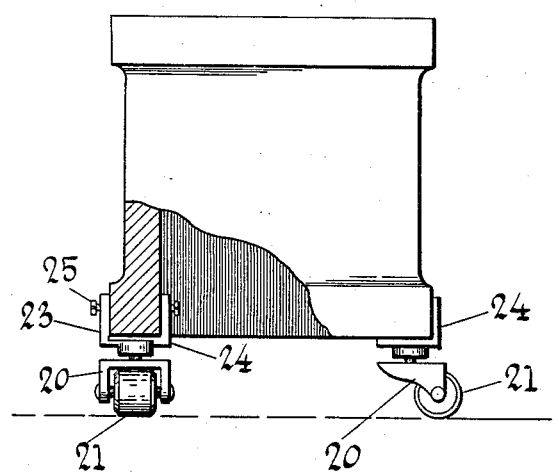

My invention is illustrated in the annexed drawings, Figure 1 being a side elevation of a caster embodying my present improvement and Fig. 2 is a vertical, transverse sectional view on the line 2—2 of Fig. 1. In Fig. 3 I have illustrated the manner of clamping said caster to an engine bed.

Referring to these drawings, the numeral 20 indicates a wheel frame consisting of a horizontal plate having depending end portions between which latter is pivoted a wheel 21. Swiveled on the plate 20, by means of a strong rivet 22, is a two-part frame which includes opposing sides 23—24 in which are screws 25—26 by means of which the complete caster may be clamped upon a piece of machinery, as will be understood by reference to Fig. 3 of the drawings. The side plate 23 is formed with an angle plate 23$^a$ which is extended downward to provide a hub 23$^b$ said hub and angle plate being bored to receive the hub portion 24$^a$ of an angle plate 24$^b$ that is formed integral with the side plate 24, the arrangement of parts being such that, when they are assembled, a long and substantial bearing is provided for a rivet 22 by means of which the plate 23$^a$ and 24$^b$ may be loosely connected. By preference I undercut the plate 24$^b$ as at 23$^c$, in order that the otherwise free edge portion of plate 24$^b$ may, in effect, interlock with said plate 23 and thus strengthen the structure to some extent without limiting the ready adjustment of the device. By thus swiveling the plates 23 and 24 on the frame 20, said plates are left free to adjust themselves to fit surfaces that are parallel with each other or to fit as readily surfaces that are out of parallel relation to each other. Having been thus located and adjusted, the said plates may be secured in their operative positions by means of the clamping screws 25, 26 already mentioned.

By the use of casters such as I have described, machinery and other articles of great weight may be readily moved from place to place without resorting to the use of rollers and levers, as is now most commonly practised.

Having thus described my invention, I claim as new and wish to secure by Letters Patent:

A caster, including a frame having a rotary member mounted therein, attaching means therefor comprising angular members, the horizontal portion of said angular members being in interfitted and interlocking connection, said interlocking connection including interfitting hubs, one of said horizontal portions being undercut and the other horizontal portion having a terminal received by said undercut, and an axial rivet received by one of said hubs.

FRANK W. WANDA.

Copies of this patent may be obtained for five cents each, by addressing the "Commissioner of Patents, Washington, D. C."